United States Patent [19]

Baur et al.

[11] 4,142,781

[45] Mar. 6, 1979

[54] ELECTRO-OPTICAL DISPLAY DEVICE WITH ELECTRO-OPTICAL LIGHT VALVES

[75] Inventors: Guenter Baur, Freiburg; Waldemar Greubel, Denzlingen, both of Fed. Rep. of Germany

[73] Assignee: Siemens Aktiengesellschaft, Berlin & Munich, Fed. Rep. of Germany

[21] Appl. No.: 747,035

[22] Filed: Dec. 2, 1976

[30] Foreign Application Priority Data

Dec. 3, 1975 [DE] Fed. Rep. of Germany ....... 2554226
Apr. 15, 1976 [DE] Fed. Rep. of Germany ....... 2616669
Sep. 10, 1976 [DE] Fed. Rep. of Germany ....... 2640909

[51] Int. Cl.² .............................................. G02F 1/13
[52] U.S. Cl. ..................................... 350/345; 350/338
[58] Field of Search ............ 350/160 LC, 150, 160 R, 350/338, 345, 357

[56] References Cited

U.S. PATENT DOCUMENTS

| | | | |
|---|---|---|---|
| 3,837,729 | 9/1974 | Harsch | 350/160 LC |
| 3,838,908 | 10/1974 | Channin | 350/160 LC |
| 3,840,695 | 10/1974 | Fischer | 350/160 LC X |
| 3,864,905 | 2/1975 | Richardson | 350/160 LC X |
| 3,869,195 | 3/1975 | Aldrich et al. | 350/160 LC |
| 3,950,078 | 4/1976 | Zatsky | 350/160 LC |
| 3,994,564 | 11/1976 | Somogyi | 350/160 LC |
| 3,994,565 | 11/1976 | van Doorn et al. | 350/160 LC |
| 4,042,294 | 8/1977 | Billings et al. | 350/160 LC |
| 4,043,636 | 8/1977 | Eberhardt et al. | 350/160 LC |

*Primary Examiner*—Edward S. Bauer
*Attorney, Agent, or Firm*—Hill, Gross, Simpson, Van Santen, Steadman, Chiara & Simpson

[57] ABSTRACT

Electro-optical display device which may operate either in a one or multi-color mode and utilizes electro-optical light valves for controlling transmittance of a passive light through the device characterized by passively amplifying the brightness of the display device with the addition of a light trap which includes a fluorescent plate having mirrored edge surfaces. While the invention or improvement may be utilized with any passive optical display device, it is particularly useful with a liquid crystal display device.

36 Claims, 20 Drawing Figures

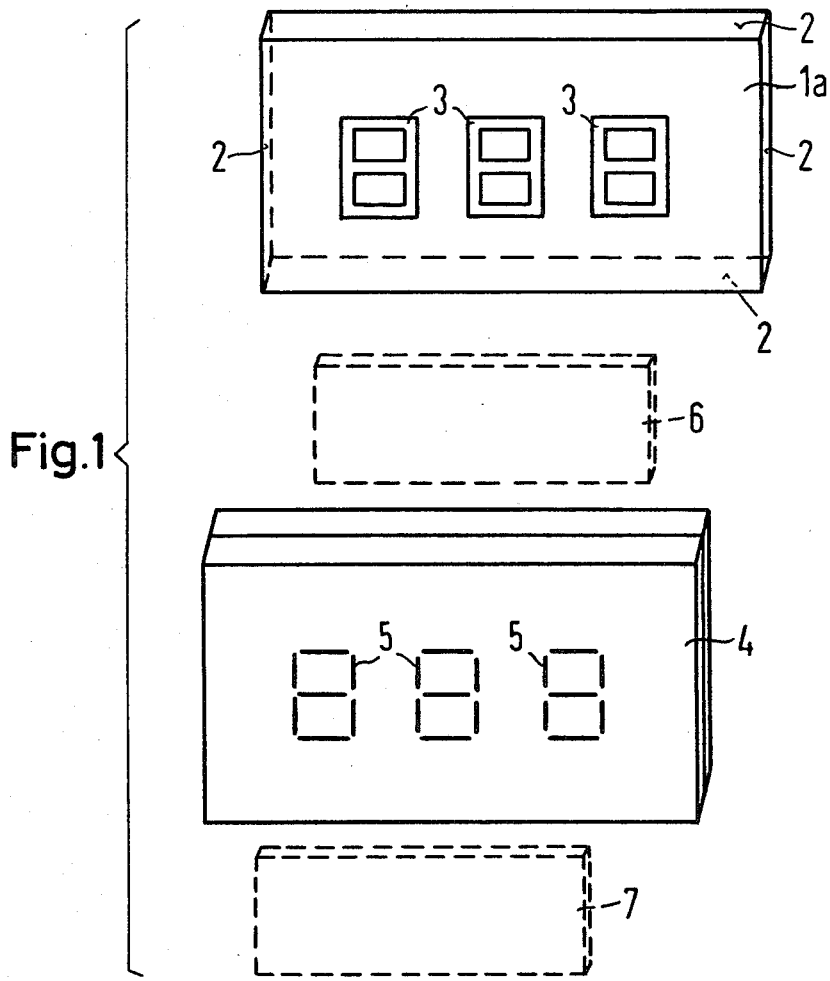
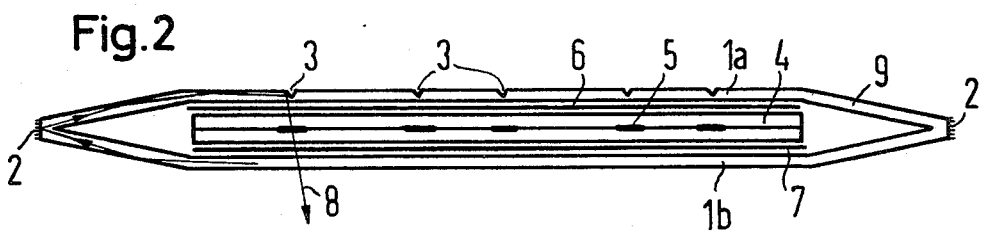

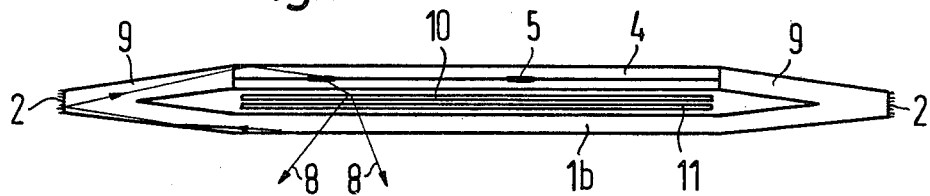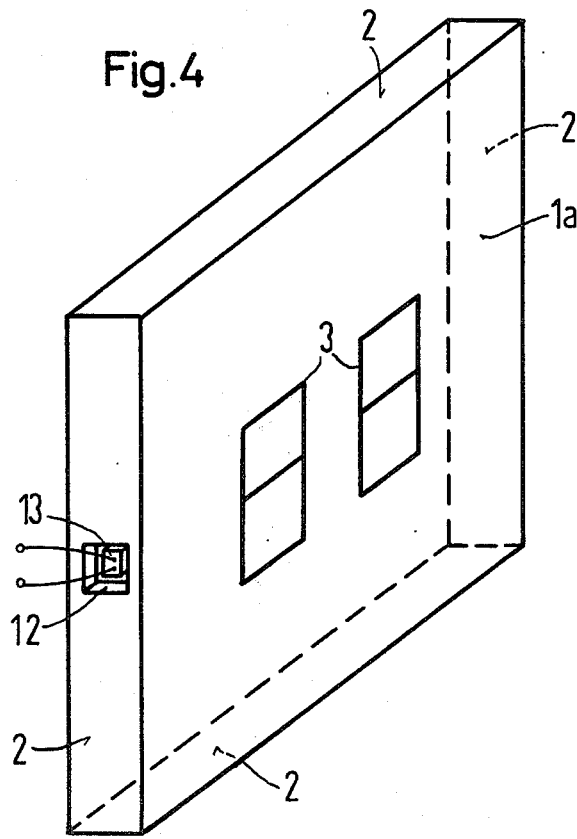

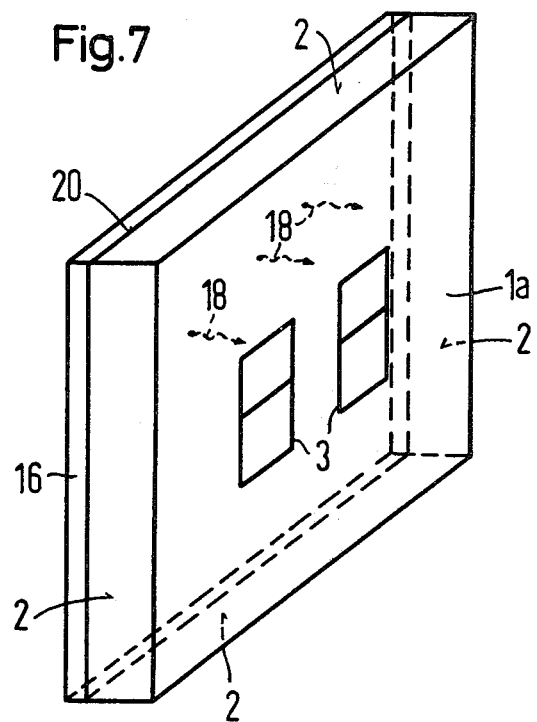
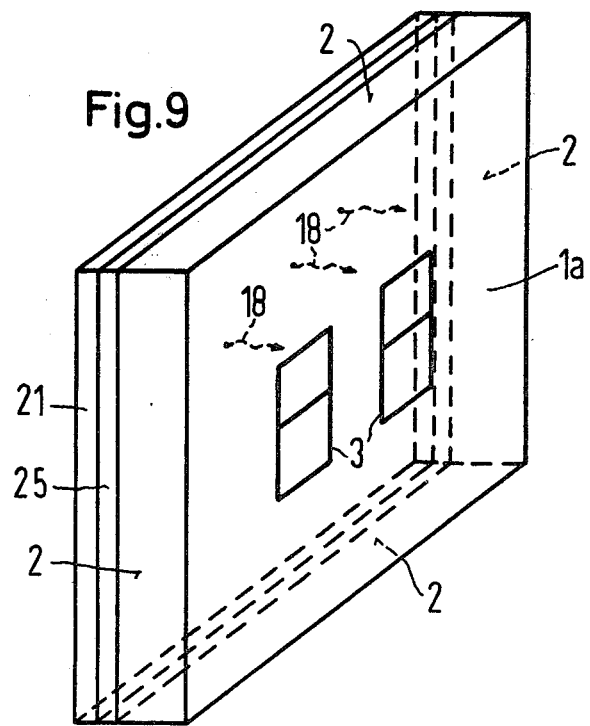

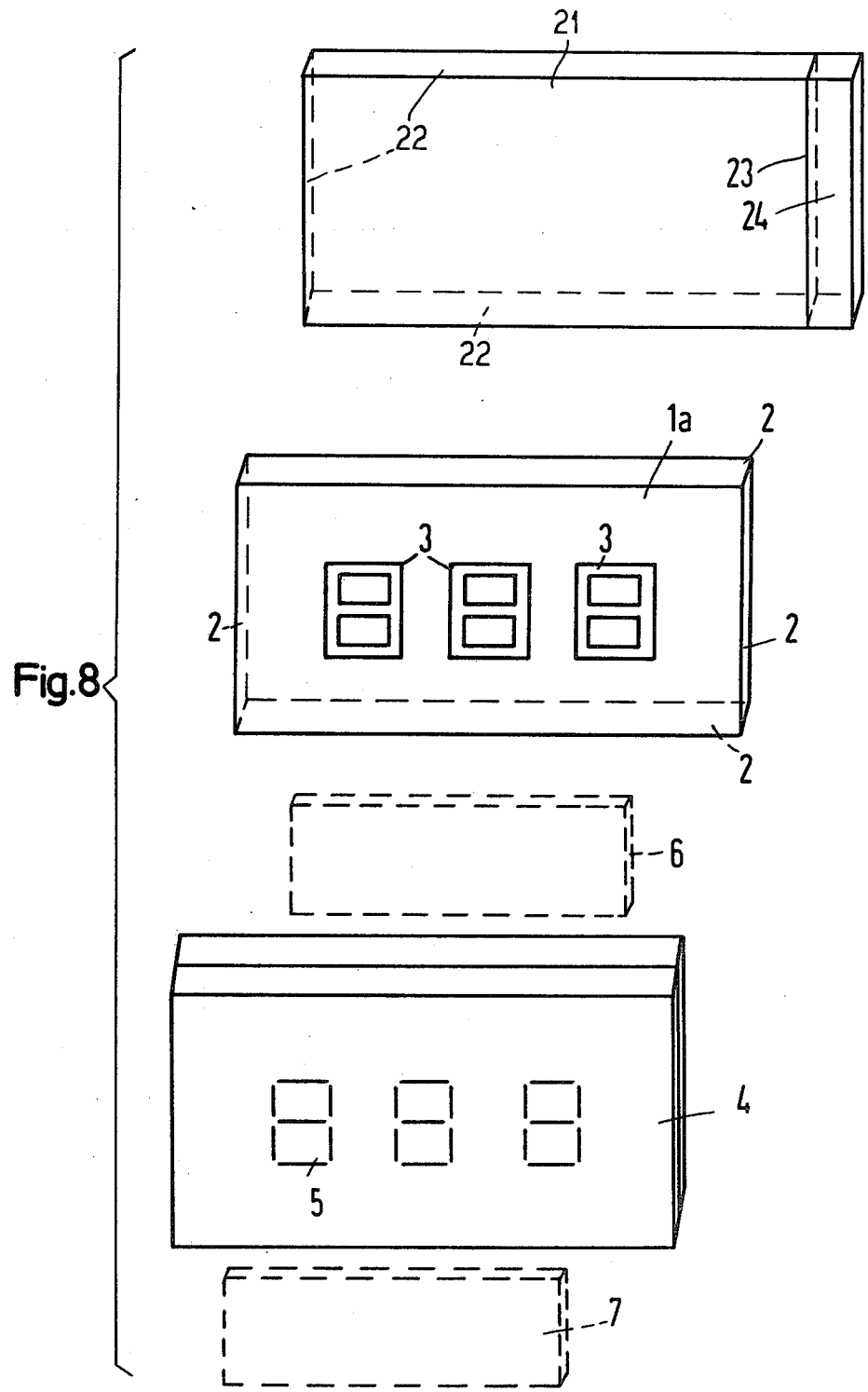

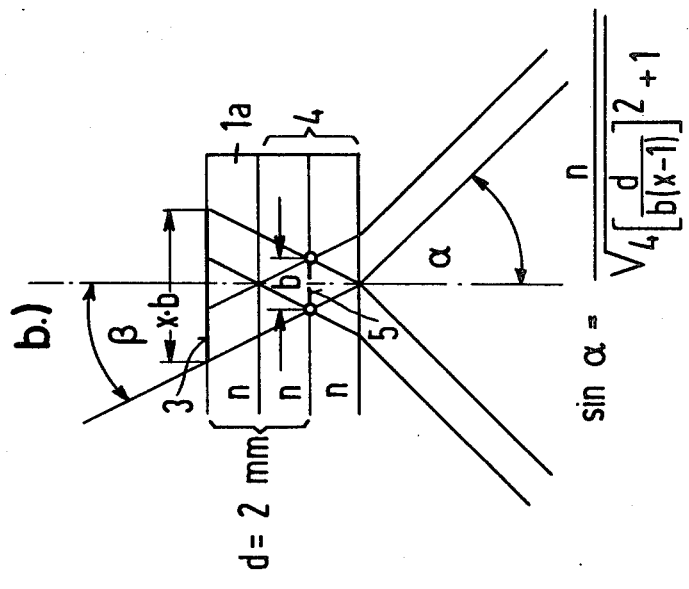
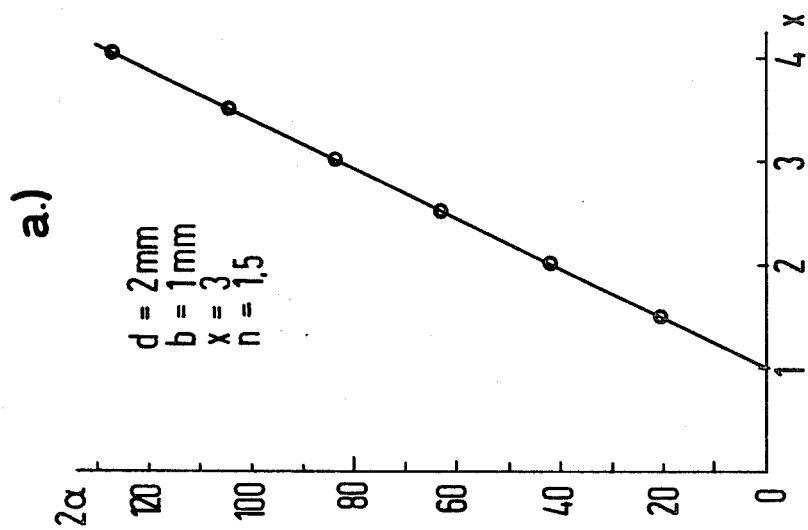
Fig. 14

ELECTRO-OPTICAL DISPLAY DEVICE WITH ELECTRO-OPTICAL LIGHT VALVES

BACKGROUND OF THE INVENTION

1. Field of the Invention

The present invention is directed to electro-optical display devices which include single and multi-color display devices which utilize electro-optical light valves such as a liquid crystal cell for controlling transmittance of a passive light from the display device.

2. Prior Art

Many different types of passive display devices are known. Examples of known passive display devices include electrophoretic, electrochromic, liquid crystals and ferroelectric displays.

Liquid crystal displays can be based on dynamic scattering as discussed in an article by G. H. Heilmeier, L. A. Zanoni, and L. A. Barton, *Proceedings of the IEEE*, Vol. 56, No. 7, July, 1968, pp. 1162. In addition, liquid crystal displays may be used as rotational cell as discussed in German Offenlegungsschrift Nos. 21 58 563 and 22 02 555.

Ferroelectric displays may use linear or quadratic electro-optical refraction effects in a ferroelectric ceramic as discussed in articles by G. H. Haertling and C. E. Land, *Journal of American Ceramic Society*, Vol. 54, 1971, page 1 and by J. R. Maldonado and A. H. Meitzler, *Proceedings of IEEE*, Vol. 59, 1971, page 368. In addition, ferroelectric displays may utilize electro-optic scattering effect in the ferroelectric ceramics as discussed in an article by W. D. Smith and C. E. Land, *Applied Physics Letter*, Vol. 20, 1972, page 169.

Electrochromic displays may utilize an electrochromic effect, for example, in a solid state film of $WO_3$ or $MoO_3$ with a redox reaction in the boundary layer with electrolytes such as $H_2SO_4$ as discussed in the article by S. K. Deb, *Appl. Opt. Suppl.*, Vol. 3, 1969, page 192.

Each of these types of display devices possesses essentially three fundamental advantages. These advantages are a small consumption of electrical energy, a contrast which is largely independent of the ambient brightness, and a flat type of construction. However, there are some disadvantages. When the display is operated in a transmission mode with a light source located behind the display, the advantage of a flat type of construction is lost.

In a reflecting mode of operation, the ambient light which enters from the viewers side is turned back or reflected back by a reflecting layer in the direction toward the viewer through the display where it is spatially modulated. In the known display devices, this type of operation has the disadvantage which is that a relatively good readability of the display is only possible under restricted viewing conditions. For example, the incident light may cause a shadow of the display element to be cast upon the reflecting surface which shadow may interfere with the display. In addition to the above problems, many of these displays, such as liquid crystal displays which rely on a field effect basis require polarizers, and the polarizers will weaken the representational contrast which will further reduce the viewing conditions.

SUMMARY OF THE INVENTION

The present invention is directed to an improvement in the readability of an optical display device having display plate with at least one electro-optical light valve or shutter for controlling the transmittance of passive light through the display plate with the improvement causing a more effective exploitation of the ambient light.

To accomplish these goals, an optical display device having a display plate with at least one electro-optical light valve for controlling transmission of the passive light through the display plate has the improvement comprising means for entrapping light and passively amplifying the brightness of the display device, said means including a fluorescent plate having mirrored edge surfaces so that the light is entrapped in the fluorescent plate and directed through each of the light valves.

The passive brightness amplification is primarily suited for all liquid crystal effects in which it is possible to switch between a light blocking and a light transmissive state by an electrical field being applied on a liquid crystal layer. This light valve effect can be achieved in all liquid crystal effects used in displays with the aid of known additional polarizers and possibly further passive optical elements. Special advantages occur with the combination of the fluorescent plate in a display having a so-called rotational cell with polarizers extending parallel to each other.

The present invention essentially exploits a phenomenon which is using a thin synthetic material plate in which fluorescent materials are dissolved to trap or collect ambient light. The trapped light is conveyed with a high degree of effectiveness to reexit in a visible and meterable manner at arbitrary points on the plate. When a fluorescent plate of this type is combined with various types of passive electro-optical displays, which functions as light valves, an increased ambient brightness adaptive illuminous density of the display elements which are electrically regulated or controlled between a light transmissive state and a light scattering or blocking state is produced.

BRIEF DESCRIPTION OF THE DRAWINGS

FIG. 1 is an exploded presentation of an electro-optical display device with passive brightness amplification using a light trap comprising a fluorescent plate positioned behind the electrically controllable light valves in accordance with the present invention;

FIG. 2 is a cross-sectional view of an electro-optical device using a light trap having a fluorescent plate disposed in front of the light valves and a second plate disposed behind the light valves;

FIG. 3 is a cross-sectional view of an electro-optical display device with a light trap for the passive light amplification in which the trap comprises a fluorescent plate in front of the electro-optical controllable liquid crystal display which display is a component part of the light trap;

FIG. 4 is a perspective view of a fluorescent plate for passive brightness amplification which plate has an additional light source;

FIG. 7 is a perspective view of another embodiment of a fluorescent plate having a phosphorescent layer;

FIG. 8 is an exploded view of an embodiment of the display device in accordance with the present invention having a fluorescent plate and a second fluorescent plate acting as high pass filter;

FIG. 9 is a perspective view of yet another embodiment of fluorescent plate in accordance with the present invention having a phosphorescent layer disposed between the fluorescent plate and a high pass filter;

FIGS. 14a and 14b illustrate a viewing angle 2 $\alpha$ which is obtained by a ratio x of the size of the exit window relative to the width of the light valve with FIG. 14a being a graph showing the relationship between the viewing angle and the ratio x;

DETAILED DESCRIPTION OF THE PREFERRED EMBODIMENTS

Figures 10, 11, 12:
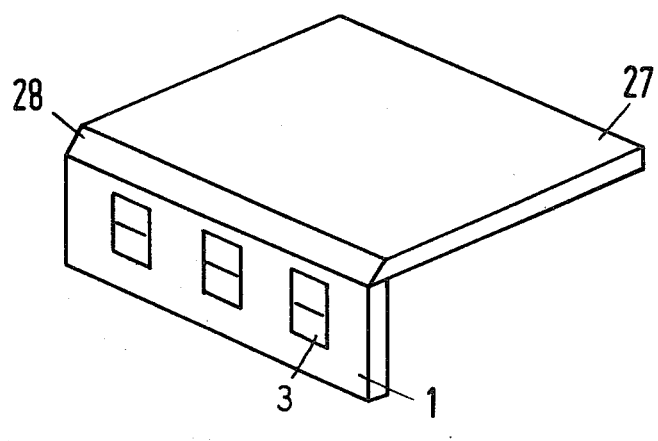
FIG. 10 is a perspective view of an embodiment of a display device in accordance with the present invention with an additional collector plate.
FIG. 11 is a graph illustrating the relation between reflected intensity $J_r$ of unpolarized light which is directed on an air-glass boundary surface as a function of the angle of incidence $\alpha$.
FIG. 12 is a graph illustrating the relation between a reflected light intensity of $J_r$ of an unpolarized light which is entrapped in a glass body striking the glass-air boundary surface as a function of the angle of incidence $\alpha$.

The present invention utilizes a flat or plane plexiglass plate having a thickness of a few millimeters and smooth surfaces. A fluorescent material has been dissolved in this plate in such a concentration that, for example, the blue portion of incident daylight is fully absorbed. Furthermore, this plate is to have the four edge surfaces extending perpendicular to the plane of the plate and these edge surfaces are ideally light reflecting so that no light can emerge at the edge of the plate. When light, such as daylight, strikes the surfaces of the plate, a portion will be reflected and a second portion will enter into the plate. As illustrated in FIG. 11, the relative reflected intensity for $J_r$ for an unpolarized light is indicated as a function of the angle $\alpha$ of incidence. When the light has an isotropic distribution such as daylight, approximately 82% of the intensity of the light will enter into the fluorescent plate. For the remergence of the light from the plate, for example the fluorescent light transmitted in the green spectrum, the reflection of the inner medium is now decisive and as illustrated in FIG. 12 as a function of the angle $\alpha$ of incidence. From these figures, it is seen that it can be calculated in good approximation, as if all the light which strikes the boundary surface under an angle not greater than $\alpha_{tot}$ ($\alpha_{tot}$ being the angle of total reflection) leaves the plate, and the light of the remaining angular range remains in the plate as a consequence of a total reflection. The angle of total reflection follows from the relationship $$n\sin\alpha_{tot} = 1$$

wherein the index of refraction n = 1.49 for plexiglass and will produce an $\alpha_{tot}$ = 42°. The portion of the not-totally reflected fluorescent light or the light which is lost for the purpose of abbreviation is designated as a loss factor V and is determined by the following equation:

$$V = 1 - \cos\alpha_{tot} = \frac{n - \sqrt{n^2 - 1}}{n}$$

in this example, with n = 1.49, loss factor V = approximately 25%.

The light emitted within the angular region of total reflection, for example in the above example, is approximately 75% and is conveyed by a continual loss-free total reflection in the plate. The average direction of propagation lying parallel to the plane of the plate. Thus, the fluorescent plate functions as a light trap.

The fluorescent light captured in the fluorescent plate as a consequence of total reflection can now be caused to exit from the plate by reflection at or from reflecting or light scattering surfaces which are attached to the fluorescent plate. For abbreviation, such specific attach surfaces are designated as exit windows. A few examples of simple types of exit windows for decoupling light from the fluorescent plate are depicted in cross section in FIGS. 13a–d.

Neglecting dimension reflection lossess and the unavoidable re-emergence losses, and assuming that no other losses are present in the plate, the "brightness amplification factor", i.e. the factor which indicates the increase of the illuminous density (surface brightness) of the fluorescent plate exit windows vis-a-vis the illuminous density of the non-fluorescing same color surface is essentially given by the ratio of relationship of the light absorbing surface of the arrangement to the total surface of the exit windows of the fluorescent plate.

The principles of the present invention combine the fluorescent plate as described above with an electro-optical display device having light valves or shutters which are also called light gates. The display device is to be understood as a display in which the light valves or display elements are switched between a light transmissive condition and a light blocking or scattering state by the application of an electrical field to transparent electrodes disposed on a thin layer of the electro-optical material. These displays often require the use of polarized light and are provided with thin polarizing films. An example of a known type of display is the liquid crystal display which utilizes a layer of liquid crystal material disposed between the transparent electrode to form a liquid crystal cell. In one type of liquid crystal display, the molecules of the liquid crystal layer are aligned parallel to each other and extend perpendicular to the surface of the cell so that a polarized light will pass through the cell unaffected. The application of an electrical field to the transparent electrodes causes a scattering of the alignment of the liquid crystal molecules which scattering will depolarize a polarized light passing through the cell. In such a liquid crystal device, the cell is arranged between cross-polarizers so that light will not pass through the cell until an electrical field is applied to the transparent electrodes to produce an area of the display to be light transmissive. In another type of liquid crystal display device utilizes a "rotational cell" wherein the liquid crystal molecules are aligned parallel to the surfaces of the cell with the molecules adjacent one surface of the cell extending perpendicular to the direction of the molecules of the other surface. In such a cell, the polarized light passing through the cell will have the direction of polarization rotated 90°. An application of an electric field to the transparent electrodes of the cell will cause the molecules to be oriented perpendicular to the surface of the cell so that a polarized light will pass through the cell without any rotation of the direction of polarization.

In addition to combining the fluorescent plate with the above known types of electro-optic display devices utilizing the effects of liquid crystals, the light trap of the present invention may be utilized with display devices using the following types of electro-optical effects:

(a) Linear and quadratic electro-optical double refraction effects in ferroelectric ceramic as discussed in the above mentioned articles by G. H. Haertling and C. E. Land, *Journal of American Ceramic Society*, Vol. 54, 1971, page 1 and J. R. Maldonado and A. H. Metizler, *Proceedings of the IEEE*, Vol. 59, 1971, page 368;

(b) Electrochromic effects, for example, a solid state film of $WO_3$ or $MoO_3$ with a redox reaction in the boundary layer with an electrolyte such as $H_2SO_4$ as discussed in an article by S. K. Deb, *Appl. Opt. Suppl.*, Vol. 3, 1969, page 192; and (c) Electro-optical scattering effects in ferroelectric ceramics as discussed in an article by W. D. Smith and C. E. Land, *Appl. Phys. Lett.*, Vol. 20, 1972, page 169.

An embodiment of a device utilizing the principles of the present invention is illustrated in FIG. 1. In this arrangement, an electro-optical device has a display plate 4 which is provided with individual triggerable segments or light valves 5. The electrode segments of each of the light valves permit a digital representation in accordance to a seven segment method. Arranged behind the display 4 is a fluoresent plate 1a which is a fluorescing synthetic material plate which has mirrored end or edge surfaces 2 and fluorescent light exit windows 3 which consist of mirrored notches in a plane surface of the plate 1a. The exit windows 3 have a shape conforming to an electrode segment 5; however, their width is greater than the electrode segment width in order to compensate for a parallax between the electrode segments 5 and the exit windows 3. Behind the fluorescent plate it is possible, if necessary, for another light absorbing film to be situated which film must not however be in optical contact with the fluorescent plate. This film will serve to make the fluorescent plate, which naturally shows a characteristic color of its own transillumination, appear as "black" as possible and thus provide a favorable influence on the display contrast. In case the display plate 4 utilizes an electro-optical effect which requires polarized light, polarizers 6 and 7 (indicated in broken lines) are attached on the front and back side of the display plate in the region of the light valves 5.

The exciting light will pass from the front of the display in all directions through the display into the fluorescent plate. The fluorescent light, which will be indicated in subsequent figures such as FIG. 2 by an arrow 8, will leave the fluorescent plate through the exit windows 3 and go forward through the light valves such as 5. However, only those electrode segments of the light valves 5 which have an electrical field applied thereto to make them in a light transmissive state, will pass the light, and the other light valves, which are in a blocking condition, will block the fluorescent light. In this arrangement, a display digit will appear bright on a dark piece.

If the polarizers 6 and 7 are required and are neutral, that is, they will polarize light of all wavelengths, then the area of each polarizer should conform to the area of each of the light valves 5 so that the remaining surfaces of the display plate 4 is free of the polarizers and can transmit the incoming light to the fluorescent plate 1a. However, if the polarizers 6 and 7 are not neutral, but are two or more selective polarizers which will pass both polarizing directions for light of the range of the excitation light for the fluorescent screen, and only polarize the rest of the spectrum, the excitation light passes the polarizers unweakened. In this manner, the entire display surface can be utilized as the light collector surface and thus the amplification factor can be significantly increased.

A further modification of the invention permits an electrical switching between two different colors. To accomplish this, the fluorescent plate contains a mixture of fluorescent material for two different colors. For example, the mixture creates both red and green fluorescent light. If the fluorescent plate transmits both red and green light, it is only necessary to replace the polarizers 6 in FIG. 1 by a combination of two selective polarizers. One of the two polarizers is a horizontal polarizer but passes green light unpolarized and the other polarizer of the combination is a vertical selective polarizer which will only pass red light unpolarized. After passage through this polarizer combination, the fluorescent light consists of horizontally polarized red light and vertically polarized green light. Consequently, the entire arrangement only lets the green fluorescent light pass through the light valves 5 when no voltage is applied thereto. However, when a voltage is applied, only red light will be able to pass through the segments of the light valves. The same effect will also come about by substitution of the front polarizer with the described combination of two polarizers.

If the emission of the fluorescent plate 1a is already polarized, the requirement of the rear polarizer 6 would be superfluous. The fluorescent plate can be produced to have a polarized emission by means of embedding fluorescent molecules with their longitudinal axes in a preferential direction. The alignment of these molecules can be achieved with form-anisotropic fluorescent molecules, which were dissolved in the synthetic material plate, being oriented in accordance to a known method by stretching the synthetic material plates in one direction.

A second embodiment of the present invention is illustrated in FIG. 2. In this embodiment, a fluorescent plate 1b which will receive the ambient light is placed before the display plate 4 and is optically connected to the fluorescent plate 1a which has exit windows 3 by end segments 9 which have mirror end surfaces 2 to reflect the fluorescent light 180°. In this device, the viewer indicated by the eye 14 will look at the display 4 through the front fluorescent plate 1b. The fluorescent light 8 will leave the exit windows 3 to pass through the light valves 5 which are selectively controlled to be either light transmissive or blocking. The fluorescent plates 1a and 1b with the extension 9 on the three narrow sides of the display plate 4 thus constitute a sort of hood or envelope which receives the display plate 4. In this embodiment, polarizers 6 and 7 may be used if required by the particular type of display plate 4. In this embodiment there is an advantage that the ambient light can be better utilized since it does not pass through the display plate 4 and in addition, neutral polarizers can be used in place of selective ones without any light loss. The production of the hood-shaped fluorescent plate of this type is easily accomplished by an injection die casting process.

Another embodiment of the present invention is illustrated in FIG. 3. In this arrangement, a fluorescent plate 1b is attached in front of an electrically controllable liquid crystal display 4 which is a component part of the light trap. The arrangement consists of the fluorescent plate 1b having extensions 9 which are in optical contact with the edges of the display 4. The extensions 9, as in the previous embodiment, are provided with mirrored end surfaces 2 so that light is reflected 180° from the fluorescent plate 1b into the display plate 4. The display device 4 consists of a liquid crystal display or cell which contains a liquid crystal layer which becomes light scattering under the influence of an electrical field as discussed in the above mentioned article by Heilmeier, et al. As the electrode segments of each of the light valves 5 have an electrical voltage applied thereto, the dynamic light scattering in the liquid crystal layer will partially deflect the fluorescent light, which was traveling in the plane of the display 4, so that it can leave the liquid crystal cell. Since the diffusion or scattering angles during the dynamic scattering are relatively small, the fluorescent light leaves the liquid crystal display at an acute angle. For this emerging fluorescent light to be visible to the eye of the viewer 14, it is again deflected by a film 10 which may be either a light diffusing layer or a film having a fluorescent material pigment layer. If the film 10 is a fluorescent material pigment layer, it should not be excited to fluorescence by ambient light entering from the front of the display and is, therefore, covered with a filter film 11 which only lets the fluorescent light of the film or foil 10 pass through. This embodiment of FIG. 3 distinguishes itself by having no locally fixed exit windows 3 as in the previous mentioned embodiments. But rather, the emergence of the fluorescent light from the light trap which includes the display plate 4 is controlled by the display elements or light valves themselves. Thus, the display windows assume the position of the energized light valves. Therefore, this arrangement is particularly suitable for matrix displays which have the electrodes arranged in matrix patterns.

In an embodiment of the invention illustrated in FIG. 4, the fluorescent plate 1a which acts as a passive brightness amplification is provided with an additional light source so that the display may be operated in a time of darkness. The fluorescent plate 1a has mirrored end surfaces 2 and the fluorescent light exit windows 3. At one end surface, a rectangular recess 12 is provided. An additional small light source 13, for example illuminescent diode (LED), is provided in the recess 12. Thus, light from the source 13 will travel through the plate 1a to cause the fluorescent light for the display.

Figure 5:
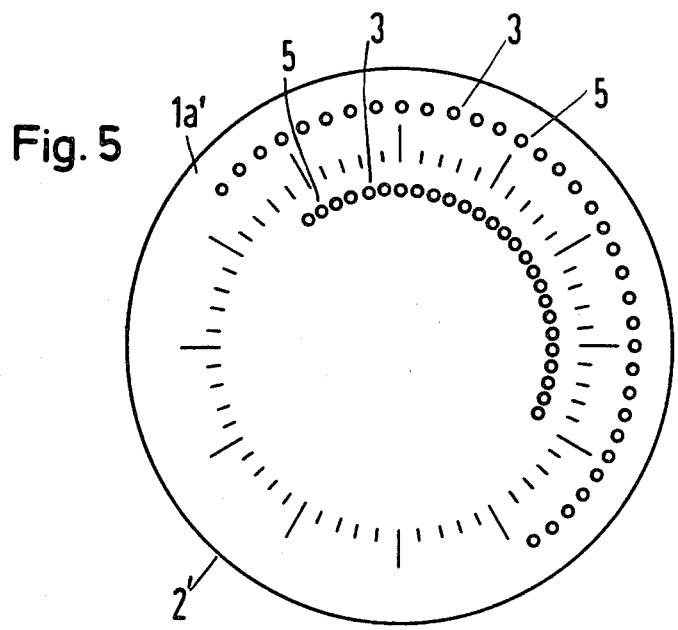
FIG. 5 is a plan view of a quasi-analog display in the form of a large clock as in the sample embodiment of a display device constructed in accordance with the present invention.

A quasi-analog display in the form of a large clock is illustrated in FIG. 5 and is a further sample embodiment of the electro-optical display device with a fluorescent plate creating passive brightness amplification. A fluorescent plate 1a' with a mirrored circumferential surface 2' is provided with an inner and outer ring, respectively, of 60 light exit windows 3 which will display hours and minutes, respectively. The electro-optical display will have electrode segments or individual light valves, which correspond to each one of the light exit windows 3 with one light valve 5 for each exit window 3. A single light valve 5 for each of the inner and outer rings of exit windows can be triggered to represent the time in hours and minutes. The 120 elements or light valves of the display can be wired in a matrix fashion and can, therefore, be triggered statistically with little expense for the triggering electronics. Thus, a multiplex operation is not necessary.

Figure 6:
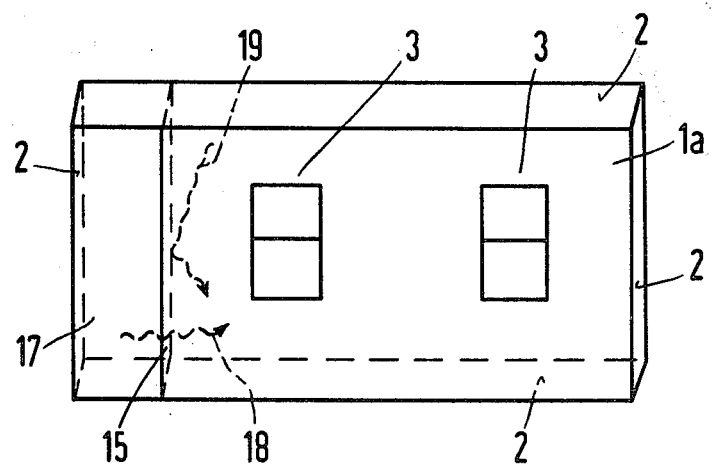
FIG. 6 is a perspective view of a fluorescent plate which is provided with a dichroitic mirror on one end surface and is in optical contact with a body which has a phosphorescent substance embedded therein.

FIG. 6 is a sample embodiment of a fluorescent plate with additional fluorescent excitation by means of a phosphorescing substance so that the device utilizing the plate 1a can be used in the dark. The device consists of a fluorescent plate 1a with mirrored surfaces 2 on three edges, with the fourth edge being free of any mirrored surface. The fluorescent plate 1a is in optical contact with a synthetic material plate 17 in which phosphorescing particles (not illustrated) with long afterglow time, for example zinc sulphide, are embedded. The synthetic plate 17 also has the three mirrored end or edge surfaces. The contact surface between both plates 17 and 1a bears a dichroitic mirror 15 which will pass the phosphorescent light designated by the arrow 18; however, the mirror 15 will reflect the fluorescent light designated by the arrow 19. Thus, the phosphorescent light 18 will enter the fluorescent plate 1 to cause excitement of the fluorescent light therein.

Another example of a fluorescent plate 1a having additional fluorescent excitation by means of a phosphorescent substance is illustrated in FIG. 7. In this device, the fluorescent plate 1a has the four edge surfaces mirrored and is provided with exit windows 3. A back surface 20 of the plate 1a is coated with a layer of phosphorescent particles 16 in such a way that the layer 16 has no optical contact with the fluorescent plate 1a. The part of the excitation light not absorbed by the fluorescent plate 1a is absorbed in the phosphorescent particles of the layer 16 which absorption causes the emission of a phosphorescent light 18 which can additionally excite the fluorescent plate 1a.

In some applications of the display device, such as illustrated in FIG. 1, it is possible that the ambient light strikes not only the front surface of the display but also the back surface or side of the display. In order to be able to utilize the ambient light falling or striking the back side of the display, a high pass filter is attached behind the fluorescent plate 1a. The high pass filter only passes the part of the spectrum which is absorbed in the fluorescent plate 1a. Due to the high pass filter, no ambient light will strike the display from the rear and reach the viewer's eye in front of the display and the contrast of the display device is not reduced. The high pass filter can, for example, consist of an absorbing color film which is suitably spectorial transmissive.

An example of an embodiment with a special high pass filter is illustrated in FIG. 8. In this arrangement, the above mentioned high pass filter is replaced by a second or supplemental fluorescent plate 21 which has three mirrored edges or end surfaces 22. Solar cells provided in a body 24 are attached to the non-mirrored end or edge surface 23. The molecules embedded in the supplemental fluorescent plate 21 are selected in such a way that they absorb light of the desired range, for example, they form a high pass filter, but additionally emit light in the far red or near infrared spectrum which is the spectrum of light in which the solar cells are still sensitive. As a result thereof, the solar cells can be supplied without the brightness of the display being impaired.

Another embodiment of a fluorescent plate 1a with additional fluorescent excitation by means of a phosphorescent substance is illustrated in FIG. 9. This device consists of the plate 1a with the mirrored end or edge surfaces 2 and exit windows 3. Behind the fluorescent plate 1a is a layer 25 which contains phosphorescent particles and which has no optical contact with the fluorescent plate 1a. Situated behind the phosphorescent layer or plate 25 is a high pass filter, for example an additional or second fluorescent plate 21. The portion of the excitation light striking from the front of the display and not absorbed by the fluorescent plate 1a and the portion of the excitation light striking from the rear and not absorbed by the high pass filter or the supplemental fluorescent plate 21 are absorbed in the phosphorescing layer 25 to cause emission of phosphorescent light 18 which can additionally excite the fluorescent plate 1a. As a result, an afterglow of the display will occur in the dark.

The amplification factor of the device can also be increased in other ways than by a choice of the selective polarizers or of a high pass filter. For example by a skillful enlargement of the light absorbing surfaces of the fluorescent plate as illustrated in FIG. 10. As illustrated in FIG. 10, a part of the surface of the housing in which the display, for example a light crystal display is installed, can easily be used as an additional collecting surface. In this embodiment, an additional collector plate 27 of fluorescing synthetic material is connected to the fluorescent plate 1a which has exit windows 3 via a 45° mirrored end surface 28 so that light produced in the plate 27 is coupled into the plate 1a.

The brightness amplification critically depends on several factors. In the following, the function of the fluorescent plate in cooperation with the light valve will be divided into the following three categories: light collection, light conduction and light coupling out.

LIGHT CONDUCTION:

1. Loss factor $$V = 1 - \cos \alpha_{tot} = \frac{n - \sqrt{n^2 - 1}}{n}$$

The loss factor V will equal a portion of the not-totally-reflected fluorescent light.

2. Fluorescence quantum yield =

$$\frac{\text{Number of the absorbed light quantums}}{\text{Number of the emitted light quantums}}$$

This ratio should be as close to 1 as possible.

3. Ratio of absorbed band width to emission band width. This ratio should be as large as possible and is achieved by means of a mixture of fluorescent materials whose absorption bands lie in different ranges but which have approximately identical emission bands.

4. Fluorescent material concentration $$J = J_o \times 10^{-\epsilon Cd}$$

wherein $J$ = absorbed intensity, $J_o$ = initial intensity, $\epsilon$ = extinction coefficient with a typical valve being $5 \times 10^4$ (liters/mole $\times$ cm), $C$ = mole or concentration of the fluorescent material with the upper reasonable limit for C is the concentration at which self-quenching of the fluorescent commences. For example, $10^{-3}$ (mole/liters) and d = layer thickness. Full absorption of the main absorption band is easily achievable at a 1 mm layer thickness.

5. Chemical (photo chemical) stability of the fluorescent material.

LIGHT CONDUCTION:

6. Reflection capacity of the mirrored layers. As an illustrated, with a vapor deposited aluminum layer, the intensity reflection capacity R = 0.913. After twenty reflections, the intensity has diminished to 15% of the initial value. With a vapor deposited silver layer the intensity reflection capacity R = 0.985. After twenty reflections, the intensity has diminished to 73.5% of the initial value. R should be as close as possible to 1.

7. Absorption (and diffusion) of the synthetic material basic mass. For a 4 mm thick, clear plexiglass plate, which genuinely absorbs 1% of the light with a perpendicular light incidence, the light would already have diminished to 1/e of the initial intensity after a running time of 40 cm. Absorption is to be as small as possible.

8. Light diffusion or scattering as a consequence of surface roughness or surface contamination. As a fluorescent light is reflected much more frequently from the boundary surfaces parallel to the plate plane than on the mirrored end surfaces, it is especially important that these reflections proceed loss free, i.e. are free of either diffusion or dispersion. The plates produced in the injection die casting process generally fulfilled this condition.

LIGHT DECOUPLING:

9. Brightness amplification factor =

$$\frac{\text{Light collection surface}}{\text{Light exit window surface}}$$

Figure 13:
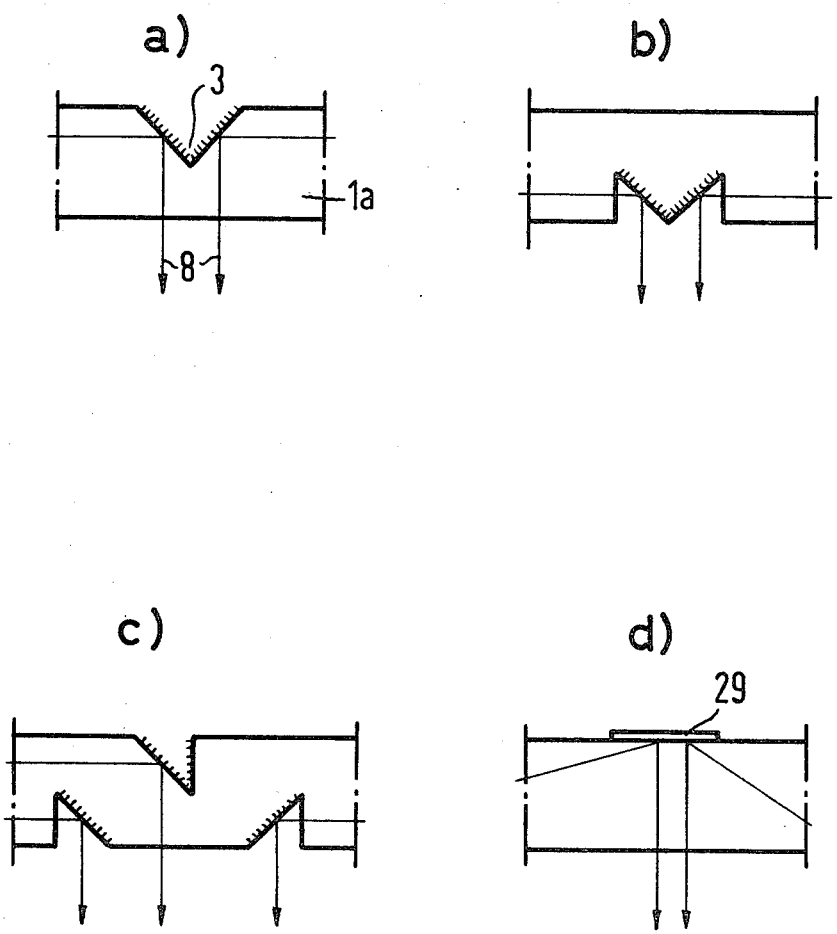
FIGS. 13a–13d are four cross-sectional views of different structures for light decoupling or exit windows.

10. Angle distribution of the emerging fluorescent light. The angle of distribution of the emerging fluorescent light depends very much on the type of coupling out or decoupling, with which in turn, the brightness of the display is influenced. Let this be briefly explained using the examples illustrated in FIG. 13. In examples 13a and 13d, the front plate surface fixes the size of the space angle region into which fluorescent light is refracted, and the limit is $2\pi$. In the example of FIG. 13b, the space angle region of the emerging light is already limited. These simple examples exit windows illustrate the substantial different angle distribution associated with each type of exit window.

11. Formation or shaping of the reflecting edges of the exit windows so that the running time of the light becomes short. It is easily understandable that in case no losses occur in light propagation, the kind of light decoupling and its effectiveness would have no influence on the illumination density of the exit window. As the ideal case of no losses is reached, the demands on the light decoupling effectiveness becomes less or is decreased. The most favorable formation of the reflecting edge surfaces of the fluorescent plate must be found empirically in each individual case. The rectangular form is certainly not always favorable. Furthermore, it is easy to see that the light decoupling effectiveness and the uniform illumination of the exit window cannot be simultaneously maximuzed. Thus, in each case, an adapted compromise may be sought.

The way the viewing angle region 2α of the display depends on the ratio x of the exit window width x·b to the display segment width b is depicted in FIGS. 14a and 14b. As the ratio x increases, the viewing angle 2α increases.

FIGS. 13a–c show exit windows formed by notches having mirrored surfaces. In FIG. 13d, dispersion or diffusion of the light from the plate is accomplished by a color pigment layer 29 disposed on a surface of the plate.

Figure 15:
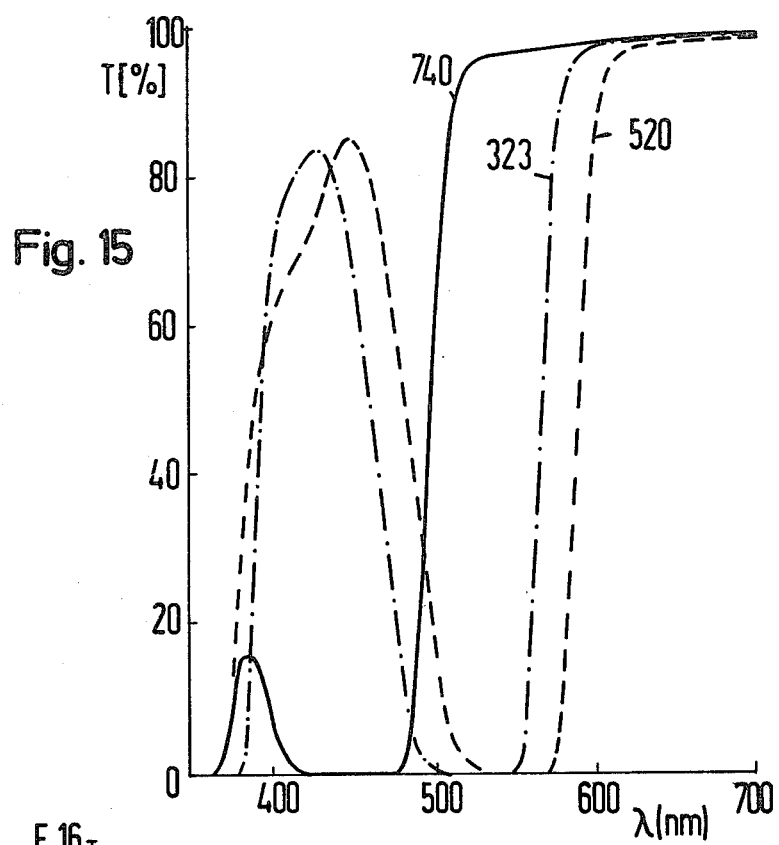
FIG. 15 is a graph illustrating the transmission curves of three commercially available plexiglass plates which flouresce in different colors.
Figure 16:
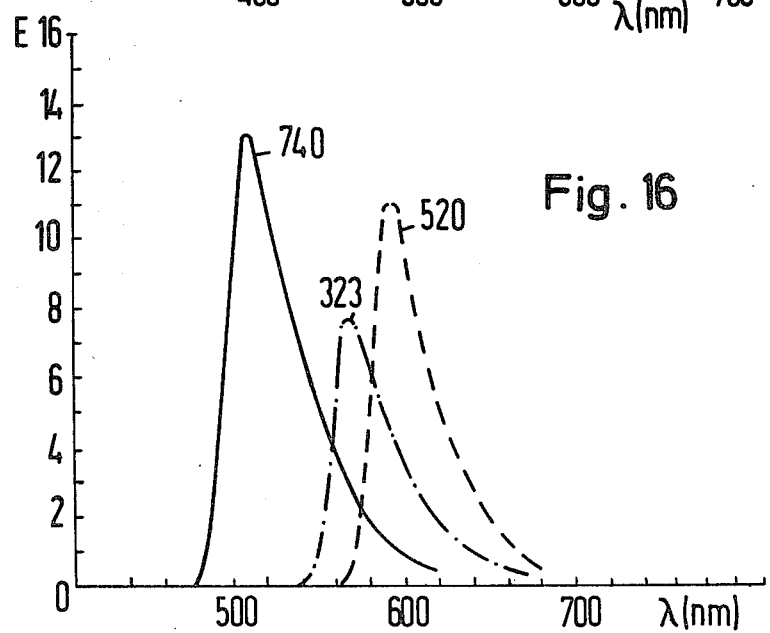
FIG. 16 is a graph illustrating the emission curves of the plexiglass plates of FIG. 15.

FIGS. 15 and 16, the light transmission curves and the fluorescent emission curves, respectively, of different color fluorescent plates, which can be commercially obtained, are reproduced. The invention has been tested using these various fluorescent materials. In the graph of FIG. 15, the transmission T is plotted in percent against the light wavelength λ (nm). In this connection, the solid curve line 740 reproduces the measurement values of a green fluorescent material (green 740), the broken line 520 reproduces the measurement values of a red fluorescent material (red 520) and the chain line curve 323 are the results of a yellow fluorescent material (yellow 323). The measurements were carried out on a 3 mm thick fluorescing glass plate with compensated reflection losses. In the diagram in FIG. 16, the emission E is plotted against the wavelength λ (nm) in arbitrary units. For measuring the emission, the same kind of plexiglass plates were used from which the transmission measurements were were already obtained. In both figures, the curves which were obtained from the same kind of plexiglass plates are drawn in the same kind of manner and identified by the same numbers. The designations green 740, red 520 and yellow 323 are designations of the Roehm Company for fluorescent plates. The green emitting plexiglass plate was excited with a wavelength of 430 nm and the other two plates were excited at a wavelength of 535 nm.

In conclusion, the essential advantages of the inventive device which substantially expands the range of application for passive light displays and in particular liquid crystal displays is summarized as follows:

1. Without additional light source, it is possible to obtain exceptionally high, previously unachieved brightness with high contrast.

2. The readability of the display is independent of the ambient brightness in previously achieved limits.

3. The displays are free of parallax and shadows.

4. The device makes it possible to also readily switch between two colors.

5. The device is simple, inexpensive and flexible. Since it is easy to form the fluorescent synthetic material plates, the plates can be cheaply produced by means of injection die casting processes in arbitrarily complicated forms. Thus, special display illumination constructions can be easily accommodated.

Although minor modifications may be suggested by those versed in the art, it should be understood that we wish to employ within the scope of the patent warranted hereon, all such modifications as reasonably and properly come within the scope of our contribution to the art.

We claim:

1. In an optical display device having a display plate with at least one electro-optical light valve for controlling transmittance of light through the display plate, the improvement comprising means for collecting light and amplifying the brightness of the display device, said means including a flourescent plate having mirrored edge surfaces so that light is collected in the flourescent plate and directed onto each of the light valves.

2. In an optical display device according to claim 1, wherein each of the electro-optical light valves comprises electrodes for applying an electric field to a liquid crystal layer.

3. In an optical display device according to claim 1, wherein the fluorescent plate has a fluorescent light exit window in registry with each of the electro-optical light valves.

4. In an optical display device according to claim 3, wherein each of the electro-optical light valves includes means for applying electrical field on a ferroelectric ceramic to control transmittance of light therethrough.

5. In an optical display device according to claim 3, wherein each of the electro-optical light valves comprises means for creating electrochromic effect.

6. In an optical display device according to claim 3, wherein the fluorescent plate is disposed behind the electro-optical light valves.

7. In an optical display device according to claim 3, wherein said means comprises a first flourescent plate disposed in front of the electro-optical light valves and a second flourescent plate disposed behind the electro-optical light valves, said first and second plates being optically interconnected by extensions having reflecting end surfaces.

8. In an optical display device according to claim 3, wherein the exit windows of the fluorescent plate comprise notches having metallic mirrored coatings.

9. In an optical display device according to claim 3, wherein the exit windows of the fluorescent plate comprise light dispersing color pigment layers disposed on a surface of said fluorescent plate.

10. In an optical display device according to claim 1, wherein each of the electro-optical light valves comprises means for applying a field across a liquid crystal layer to control the transmittance of light therethrough, wherein the flourescent plate is disposed in front of the electro-optical light valves, and wherein the means for collecting light includes the electro-optical light valves optically connected to the flourescent plate by extensions having reflecting end surfaces, said electro-optical light valves when energized creating light exit windows for causing the emission of light from the means for collecting light.

11. In an optical display device according to claim 10, which includes a light diffusing layer disposed in front of the electro-optical light valves.

12. In an optical display device according to claim 10, which includes a film having a fluorescent material pigment layer disposed in front of the electro-optical light valves.

13. In an optical display device according to claim 12, which includes a filter film disposed in front of said film, said filter film being of a material that only passes the fluorescent light created by the fluorescence material pigment layer.

14. In an optical display device according to claim 1, wherein the fluorescent plate includes an additional source of illumination.

15. In an optical display device according to claim 1, wherein the additional source of illumination comprises a light source received in a rectangular recess in the fluorescent plate.

16. In an optical display device according to claim 14, wherein the additional source of illumination comprises a synthetic material plate having phosphorescing particles embedded therein, said synthetic material plate being in optical contact with an end surface of the flourescent plate, said end surface having a dichroic mirror so that illumination from the phosphorescing particles can pass into the flourescent plate to create additional flourescent excitation therein whereas the flourescent light is reflected.

17. In an optical display device according to claim 14, wherein the additional source of illumination comprises a layer of phosphorescent particles adjacent the back side of the fluorescent plate, said layer of phosphorescent particles being spaced from the back side of the fluorescent plate so that no optical contact exists between the fluorescent plate and the layer of phosphorescing particles.

18. In an optical display device according to claim 1, wherein the flourescent plate is provided with an inner and outer ring, respectively, of light exit windows which will display hours and minutes of a clock.

19. In an optical display device according to claim 1, wherein the fluorescent plate is disposed behind the display plate and includes a filter disposed on a surface of the fluorescent plate opposite the viewing direction, said filter being of a material so that only light of the part of the spectrum which is absorbed in the fluorescent plate is passed therethrough.

20. In an optical display device according to claim 19, which includes a layer of phosphorescent particles disposed between the fluorescent plate and the filter, said layer of phosphorescent particles having no optical contact with the fluorescent plate.

21. In an optical display device according to claim 19, wherein the filter is a high pass filter.

22. In an optical display device according to claim 21, wherein the high pass filter consists of an absorbing color film.

23. In an optical display device according to claim 21, wherein the high pass filter consists of an additional fluorescent plate.

24. In an optical display device according to claim 23, wherein the additional fluorescent plate has mirrors on three end surfaces with the fourth end surface being free of a mirror and which device includes a solar cell attached to the fourth end surface.

25. In an optical display device according to claim 23, which includes a layer of phosphorescent particles disposed between the fluorescent plate and the additional fluorescent plate, said layer of phosphorescent particles not being in optical contact with the fluorescent plates.

26. In an optical display device according to claim 1, wherein said fluorescent plate comprises fluorescing molecules having an anisotropic shape, said molecules being oriented in a uniform fashion.

27. In an optical display device according to claim 26, wherein the fluorescent plate comprises a synthetic material with the molecules having an anisotropic shape disposed therein, and said uniform orientation was achieved by stretching the synthetic material.

28. In an optical display device according to claim 1, wherein each electro-optical light valve comprises electrodes for applying an electrical field to a liquid crystal layer, and wherein the fluorescent plate has an exit window associated with each of the liquid crystal light valves.

29. In an optical display device according to claim 28, which includes two linear polarizers with the display plate disposed therebetween and one of the two polarizers being disposed between the display plate and the fluorescent plate.

30. In an optical display device according to claim 29, wherein each of the liquid crystal light valves are rotational cells.

31. In an optical display device according to claim 29, wherein the linear polarizers have a form and shape corresponding to each of the liquid crystal light valves to cover the light valves and leaving the remainder of the display plate free of the polarizers.

32. In an optical display device according to claim 29, wherein the linear polarizers are arranged parallel to each other.

33. In an optical display device according to claim 29, wherein the direction of polarization of the linear polarizers are arranged perpendicular to one another, and said polarizers have a size and shape corresponding to the exit windows and overlie same.

34. In an optical display device according to claim 29, wherein the linear polarizers are selective polarizers so that light of the wavelength to excite the fluorescent material of the fluorescent plate passes through the linear polarizers unpolarized.

35. In an optical display device according to claim 29, wherein the fluorescent plate has a mixture of fluorescent material dissolved therein, said mixture fluorescing in two different colors, and wherein one of the two linear polarizers is replaced by a combination of two selective polarizers with one of said two selective polarizers polarizing light of one of said two colors and the other selective polarizer polarizing light of said other color, said two selective polarizers being disposed with their direction of polarization oriented at 90° to each other so that the direction of polarization of one of the two color components of light produced by the fluorescent plate extends perpendicular to the direction of polarization of the other component.

36. In an optical display device according to claim 1, wherein the fluorescent material of the fluorescent plate consists of a mixture of fluorescent materials having absorption bands lying in different wavelengths, said materials having approximately identical emission bands.

* * * * *